US008646562B2

(12) United States Patent
Fukawatase et al.

(10) Patent No.: US 8,646,562 B2
(45) Date of Patent: Feb. 11, 2014

(54) VEHICLE SEAT (75) Inventors: Osamu Fukawatase, Miyoshi (JP); Takehisa Shamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/504,016

(22) PCT Filed: Sep. 22, 2010

(86) PCT No.: PCT/JP2010/066449
§ 371 (c)(1),
(2), (4) Date: Apr. 25, 2012

(87) PCT Pub. No.: WO2012/039042
PCT Pub. Date: Mar. 29, 2012

(65) Prior Publication Data
US 2013/0249197 A1 Sep. 26, 2013

(51) Int. Cl.
*B60N 2/42* (2006.01)
*B60R 21/207* (2006.01)
(52) U.S. Cl.
USPC ............ 180/274; 280/730.2; 297/216.1; 297/284.1; 297/452.41
(58) Field of Classification Search
USPC ........ 280/730.2; 180/274; 297/216.1, 216.12, 297/216.13, 284.1, 284.3, 284.6, 284.2, 297/452.41
See application file for complete search history.

(56) References Cited

U.S. PATENT DOCUMENTS

| 5,564,735 A | 10/1996 | Boy et al. | |
|---|---|---|---|
| 2001/0005097 A1* | 6/2001 | Heilig et al. | 297/452.55 |
| 2008/0303326 A1* | 12/2008 | Booth et al. | 297/284.2 |
| 2009/0206585 A1 | 8/2009 | Honda | |
| 2009/0218858 A1* | 9/2009 | Lawall et al. | 297/216.1 |
| 2013/0076086 A1* | 3/2013 | Pickett et al. | 297/216.12 |

FOREIGN PATENT DOCUMENTS

| JP | A-8-40176 | 2/1996 |
|---|---|---|
| JP | A-2005-519799 | 7/2005 |
| JP | A-2008-95708 | 4/2008 |
| JP | A-2009-56190 | 3/2009 |
| JP | A-2009-101739 | 5/2009 |
| JP | A-2009-190678 | 8/2009 |

OTHER PUBLICATIONS

Nov. 9, 2010 International Search Report issued in International Patent Application No. PCT/JP2010/066449 (with translation).

* cited by examiner

*Primary Examiner* — Ruth Ilan
(74) *Attorney, Agent, or Firm* — Oliff PLC (57) ABSTRACT

A seat for a vehicle in which, when the vehicle has a side collision, pressing against a side support portion of a seat cushion by a vehicle body side portion and deformation of the side support portion to the upper side may be suppressed, and in which excellent seating comfort of the seat cushion may be maintained. At a rear seat, when a door trim (32) of a rear side door (30) collides with a side support portion (16A) due to an impact load F of a side collision, a dilatant member (46) provided at the side support portion (16A) hardens instantly. As a result, deformation of the side support portion (16A) is suppressed, and deformation of the side support portion (16A) to the upper side may be suppressed. Therefore, a waist area chamber (28B) of a rear side airbag (28) may be caused to deploy between the waist area of a seat occupant (14) and the door trim (32) as intended.

5 Claims, 8 Drawing Sheets

VEHICLE SEAT

TECHNICAL FIELD

The present invention relates to a vehicle seat that is equipped with a side airbag that inflates and deploys between a vehicle body side portion and the waist area of an occupant sitting on a seat cushion.

BACKGROUND ART

In a vehicle safety device disclosed in Japanese Patent Application Laid-Open (JP-A) No. H8-40176, a central portion of a seat back of a rear seat of a vehicle is made collapsible, and a side airbag module is installed in a side face portion (side seat portion) of the rear seat. The side face portion of the rear seat is disposed at a door side of the central portion and is fixed to the vehicle body.

In a side impact airbag device disclosed in JP-A No. 2009490678, an airbag is provided with a chest protection portion that protects the chest area of an occupant and a waist protection portion that protects the waist area of the occupant.

DISCLOSURE OF INVENTION

Subject to be Addressed by the Invention

However, when there is a collision at the side face of a vehicle, a side door intrudes to the vehicle compartment inner side. Consequently, a space for deploying an airbag into is narrowed. Moreover, when a side support portion of a seat cushion is pressed by the side door and compressed to the inner side in the vehicle width direction, the upper face side of the side support portion deforms to the upper side (lifts up). As a result, a deployment direction of a waist area protection portion of the side airbag is deflected upward by the side support portion, and it may be difficult to deploy the waist protection portion between the waist area of an occupant and the side door as intended. In order to prevent this effect, for example, adding a reinforcement member that suppresses deformation of the side support portion has been considered. However, it is necessary to avoid a deterioration in seating comfort of the seat cushion due to the addition of a reinforcement member.

In consideration of the situation described above, a subject of the present invention is to provide a seat for a vehicle in which, when the vehicle has a side collision, pressing against a side support portion of a seat cushion by a vehicle body side portion and deformation of the side support portion to the upper side may be suppressed, and in which excellent seating comfort of the seat cushion may be maintained.

Solution to Address the Subject

A vehicle seat relating to a first aspect of the present invention includes: a side airbag that, when there is a side collision of the vehicle, inflates and deploys above a side support portion of a seat cushion, between a waist area of a seat occupant and a vehicle body side portion; and a dilatant member that is formed of a material with a dilatant property and is provided at the side support portion.

The term "provided at the side support portion" as used in the first aspect is not limited to the whole of the dilatant member being provided at the side support portion, but encompasses structures in which a portion of the dilatant member is provided at a seat width direction inner side relative to the side support portion.

In the vehicle seat according to the first aspect, when the vehicle has a side collision, the side airbag inflates and deploys above the side support portion of the seat cushion, between the waist area of a seat occupant and the vehicle body side portion (a side door or the like). If the vehicle body side portion collides with the side support portion due to the impact of the side collision, the dilatant member provided at the side support portion hardens. Hence, deformation of the side support portion is suppressed, and deformation of the side support portion to the upper side may be suppressed. In addition, because the dilatant member is soft when there is no impact or a collision is weak and the like, excellent seating comfort of the seat cushion may be maintained.

A vehicle seat relating to a second aspect of the invention is the vehicle seat according to the first aspect in which the dilatant member is interposed between an upper face of a seat cushion pad and a seat cover that covers the seat cushion pad.

In the vehicle seat according to the second aspect, the dilatant member interposed between the upper face of the seat cushion pad and the seat cover at the side support portion of the seat cushion hardens when there is a vehicle side collision. Therefore, deformation of the upper face side of the side support portion of the seat cushion pad may be directly suppressed, and deformation of the side support portion to the upper side may be effectively suppressed.

A vehicle seat relating to a third aspect of the invention is the vehicle seat according to the second aspect in which the dilatant member includes: an upper wall portion that is interposed between the upper face of the seat cushion pad and the seat cover; and an outer side vertical wall portion that extends to the lower side from an end portion at a vehicle body side of the upper wall portion, and that is interposed between a side face at the vehicle body side of the seat cushion pad and the seat cover.

In the vehicle seat according to the third aspect, when the vehicle body side portion collides with the side support portion of the seat cushion because of the impact of a vehicle side collision, the collision applies an impact to the outer side vertical wall portion of the dilatant member interposed between the side face at the vehicle body side of the seat cushion pad and the seat cover. Hence, the dilatant member hardens and deformation of the side support portion is suppressed by the upper wall portion of the dilatant member interposed between the upper face of the seat cushion pad and the seat cover. In other words, in this invention the outer side vertical wall portion of the dilatant member functions as a detector for causing the dilatant member to harden. Consequently, the dilatant member may be hardened excellently. In addition, the upper wall portion and outer side vertical wall portion of the dilatant member may be interposed in narrow gaps between the seat cushion pad and the seat cover. Therefore, reductions in size and weight of the dilatant member may be realized.

A vehicle seat relating to a fourth aspect of the invention is the vehicle seat according to the first aspect, further including a displacement restriction portion that is provided at the vehicle body or a seat frame, and that restricts displacement of the dilatant member to the vehicle width direction inner side by engaging with the dilatant member.

In the vehicle seat according to the fourth aspect, when the vehicle body side portion collides with the side support portion of the seat cushion because of the impact of a vehicle side collision, the dilatant member disposed at the side support portion hardens. Displacement of the dilatant member to the vehicle width direction inner side is restricted by engagement with the displacement restriction portion provided at the vehicle body or seat frame. Therefore, a speed of intrusion of the vehicle side portion to the vehicle width direction inner side may be reduced by the hardened dilatant member bracing between the displacement restriction portion and the vehicle body side portion.

A vehicle seat relating to a fifth aspect of the invention is the vehicle seat according to the third aspect in which the dilatant member includes an inner side vertical wall portion that is extended to the lower side from an end portion of the upper wall portion at the opposite side from the end portion thereof at the vehicle body side and that is disposed in a wall accommodation portion provided in the seat cushion pad, and the upper wall portion is curved such that, viewed in the vehicle front-rear direction, a vehicle width direction central portion thereof is curved to be caved in the lower side.

In the vehicle seat according to the fifth aspect, when an impact is applied to the outer side vertical wall portion of the dilatant member by the vehicle body side portion colliding with the side support portion of the seat cushion, the dilatant member hardens. Hence, when the outer side vertical wall portion is pressed to the vehicle width direction inner side by the vehicle body side portion, the inner side vertical wall portion of the dilatant member provided in the vertical accommodation portion that is formed in the seat cushion is supported from the vehicle width direction inner side by the seat cushion pad, in addition to which the upper wall portion of the dilatant member is compressed between the inner side vertical wall portion and the outer side vertical wall portion. Viewed in the vehicle front-rear direction, the upper wall portion is formed such that a vehicle width direction central portion thereof is caved in the lower side. Therefore, when compressed as described above, the upper wall portion is bent to the lower side at about the caved-in region. In consequence, the seat cushion pad and seat cover at the side support portion dent to the lower side to follow the upper wall portion of the dilatant member. Thus, deformation of the side support portion to the upper side may be more effectively suppressed.

A vehicle seat relating to a sixth aspect of the invention is the vehicle seat according to the first aspect in which a seat cushion pad is disposed at the lower side of the dilatant member, and a recess portion is formed at a lower face side of the seat cushion pad, the recess portion forming a space between the seat cushion pad and the vehicle body or a seat cushion frame In the vehicle seat according to the sixth aspect, the recess portion is formed in the lower face side of the seat cushion pad that is disposed at the lower side of the dilatant member of the side support portion of the seat cushion. Thus, a space is formed between the seat cushion pad and the vehicle body or seat cushion frame. Therefore, when the seat cushion pad is pressed to the vehicle width direction inner side by the vehicle body side portion colliding with the side support portion, deformation of the seat cushion pad to the upper side may be suppressed by the seat cushion pad deforming in the direction in which this space is made smaller. Therefore, the dilatant member may be suppressed from being pushed up to the upper side by the seat cushion pad, and deformation of the side support portion to the upper side may be more effectively suppressed.

A vehicle seat relating to a seventh aspect of the invention includes: a side airbag that, when there is a side collision of the vehicle, inflates and deploys above a side support portion of a seat cushion, between a waist area of a seat occupant and a vehicle body side portion; and a dilatant member that is formed of a material with a dilatant property. The dilatant member is provided in a seat cushion, displacement of the dilatant member to a vehicle width direction inner side is restricted by engagement with the vehicle body or a seat cushion frame, and one end of the dilatant member is disposed at a vehicle body side of the side support portion.

In the vehicle seat according to the seventh aspect, when the vehicle has a side collision, the side airbag inflates and deploys above the side support portion of the seat cushion, between the waist area of a seat occupant and the vehicle body side portion (a side door or the like). If the vehicle body side portion collides with the side support portion due to the impact of the side collision, an impact is applied to the dilatant member, one end of which is disposed at the vehicle body side of the side support portion, and the dilatant member hardens. Displacement of the dilatant member to the vehicle width direction inner side is restricted by the dilatant member engaging with the vehicle body or seat cushion frame. Therefore, deformation of the seat cushion is suppressed by bracing by the dilatant member. Thus, deformation of the side support portion is suppressed, and deformation of the side support portion to the upper side may be suppressed. Furthermore, it may be possible for the hardened dilatant member is braced between a displacement restriction portion and the vehicle body side portion and therefore, a speed of intrusion of the vehicle body side portion to the vehicle width direction inner side may be reduced. In addition, because the dilatant member is soft when there is no impact or a collision is weak and the like, excellent seating comfort of the seat cushion may be maintained.

Advantageous Effects of Invention

As described hereabove, in the vehicle seat relating to the first aspect, when there is a side collision, the side support portion of the seat cushion being pressed by the vehicle body side portion and deforming to the upper side may be suppressed, while excellent seating comfort of the seat cushion may be maintained.

In the vehicle seat relating to the second aspect, deformation of the side support portion to the upper side may be effectively suppressed.

In the vehicle seat relating to the third aspect, the dilatant member may be excellently hardened, in addition to which reductions in size and weight of the dilatant member may be realized.

In the vehicle seat relating to the fourth aspect, a speed of intrusion of the vehicle body side portion to the vehicle width direction inner side may be reduced.

In the vehicle seat relating to the fifth aspect, deformation of the side support portion to the upper side may be even more effectively suppressed.

In the vehicle seat relating to the sixth aspect, deformation of the side support portion to the upper side may be even more effectively suppressed.

In the vehicle seat relating to the seventh aspect, when there is a side collision, the side support portion of the seat cushion being pressed by the vehicle body side portion and deforming to the upper side may be suppressed, while excellent seating comfort of the seat cushion may be maintained, and a speed of intrusion of the vehicle body side portion to the vehicle width direction inner side may be reduced.

BEST MODE FOR CARRYING OUT THE INVENTION

First Exemplary Embodiment

Herebelow, a rear seat 10, which is a vehicle seat relating to the first exemplary embodiment of the present invention, is described with reference to FIG. 1 to FIG. 4. The arrow FR that is shown in the drawings indicates the forward side of the vehicle, the arrow UP indicates the upward side of the vehicle, and the arrow IN indicates the vehicle width direction inner side. In the present exemplary embodiment, a forward direction, an upward direction and a width direction of the rear seat 10 correspond with a forward direction, upward direction and width direction of the vehicle.

Figure 1:
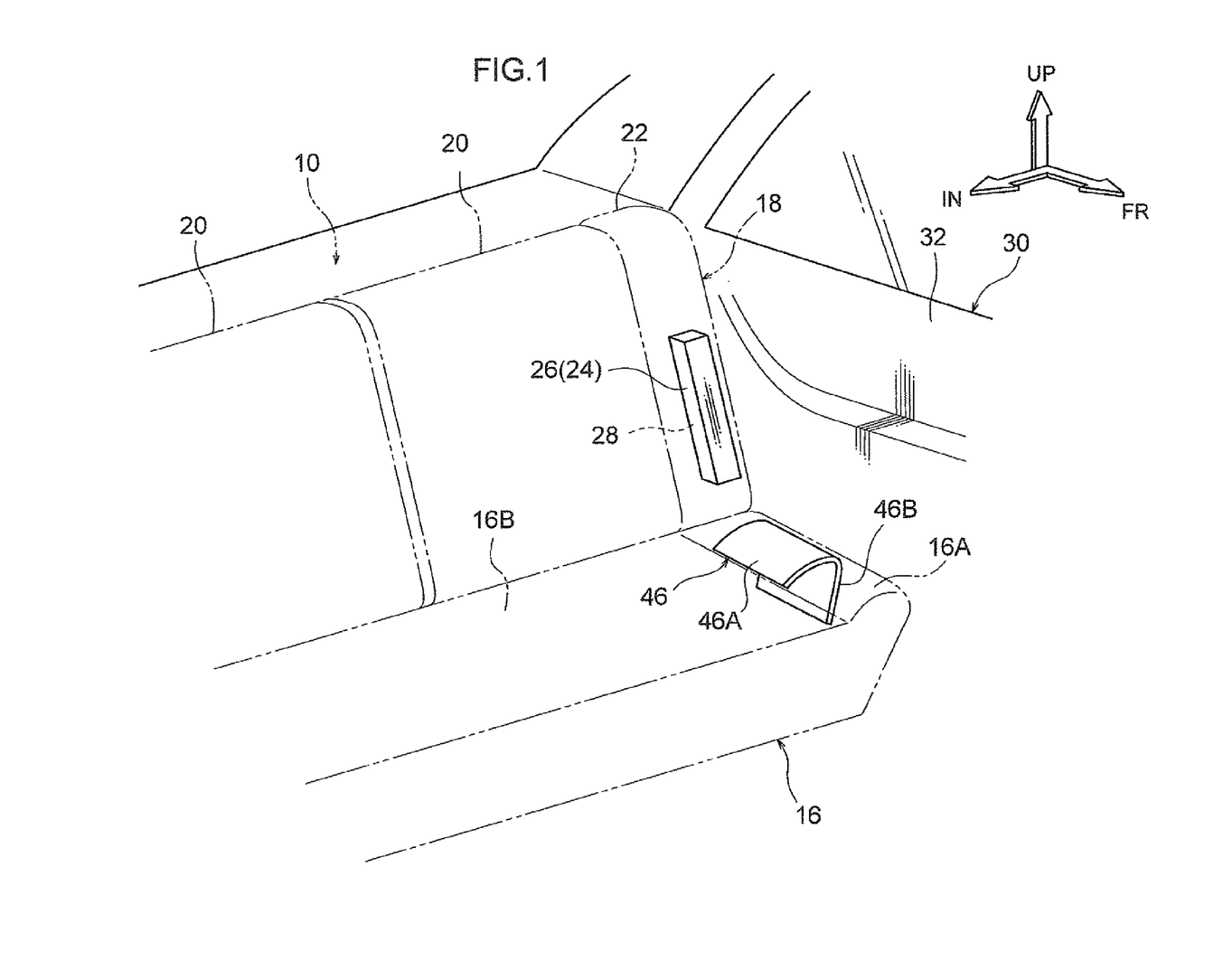
FIG. 1 is a perspective diagram of peripheral members including a portion of a rear seat relating to a first exemplary embodiment of the present invention.
Figure 2:
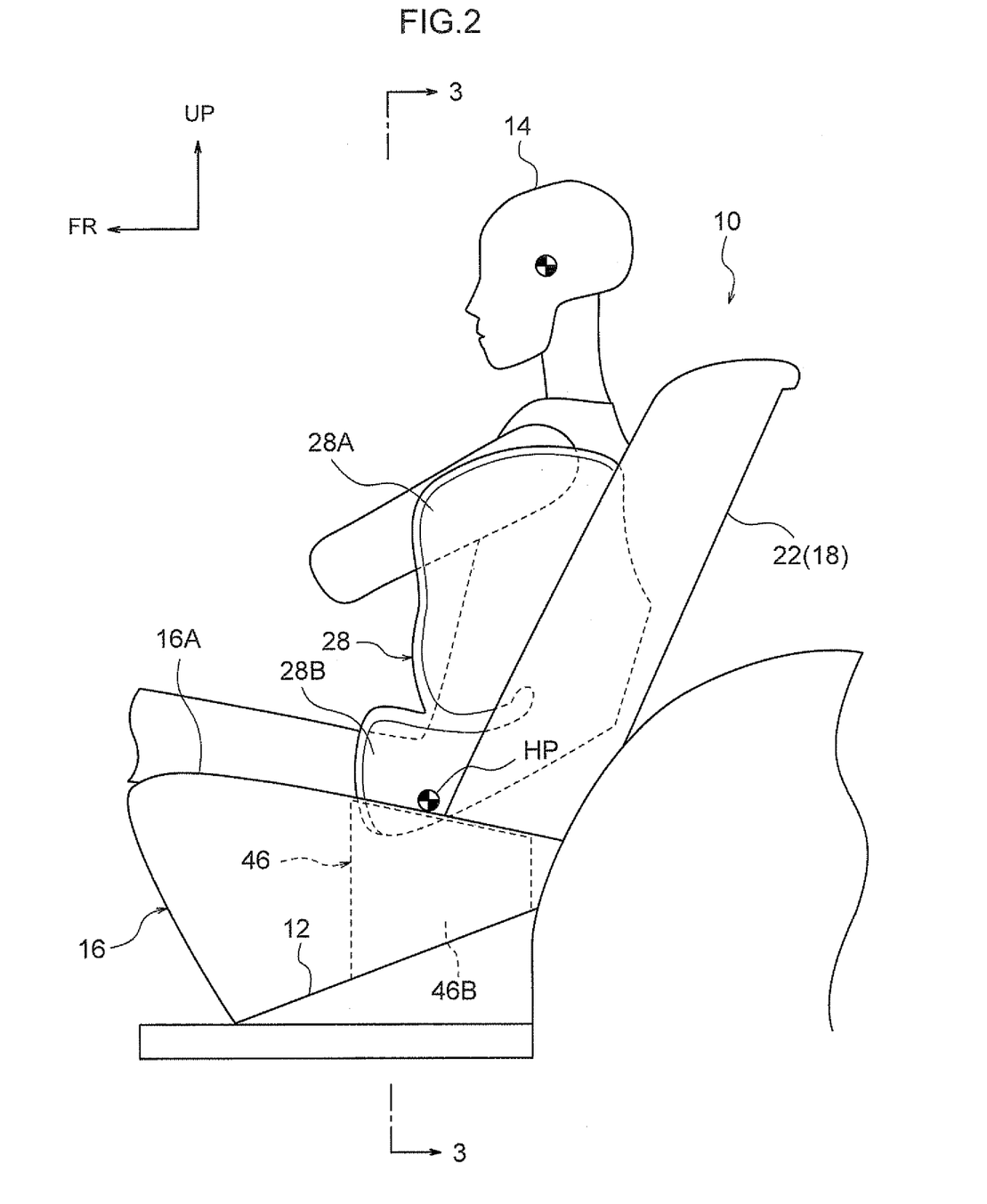
FIG. 2 is a side view of the rear seat illustrated in FIG. 1.

As illustrated in FIG. 1 and FIG. 2, the rear seat 10 is provided with a seat cushion 16 and a seat back 18 mounted on an upper portion of a rear floor panel 12 of a vehicle body (i.e., a support member provided at the support vehicle body). The seat cushion 16 supports the buttock area and thigh area of a seat occupant 14. The seat back 18 is provided standing to the upper side from a rear end portion of the seat cushion 16, and supports the back of the seat occupant 14. In FIG. 2, the label "HP" is applied to a hip point of the seat occupant 14.

The seat back 18 is a partially collapsible seat back. As illustrated in FIG. 1, the seat back 18 is provided with a pair of left and right seat back main body portions 20 and a pair of left and right side seat portions 22, which are disposed at the two vehicle width direction outer sides of the seat back main body portions 20 (only the side seat portion 22 at the left side of the vehicle body is illustrated in FIG. 1). A lower end portion of each seat back main body portion 20 is joined to the rear floor panel 12 to be turnable about an axis along the vehicle width direction, and each side seat portion 22 is fixed to the vehicle body.

An airbag module 26 constituting a rear side airbag device 24 is mounted at each side seat portion 22. The rear side airbag device 24 is publicly known in related art, and is provided with a rear side airbag 28 that is accommodated inside the airbag module 26 in a folded state. When a side collision sensor mounted in the vehicle senses a side collision possibility, the rear side airbag 28 is inflated and deployed to the forward side of the side seat portion 22 by the pressure of gas generated by an inflator (see FIG. 2).

Figure 3:
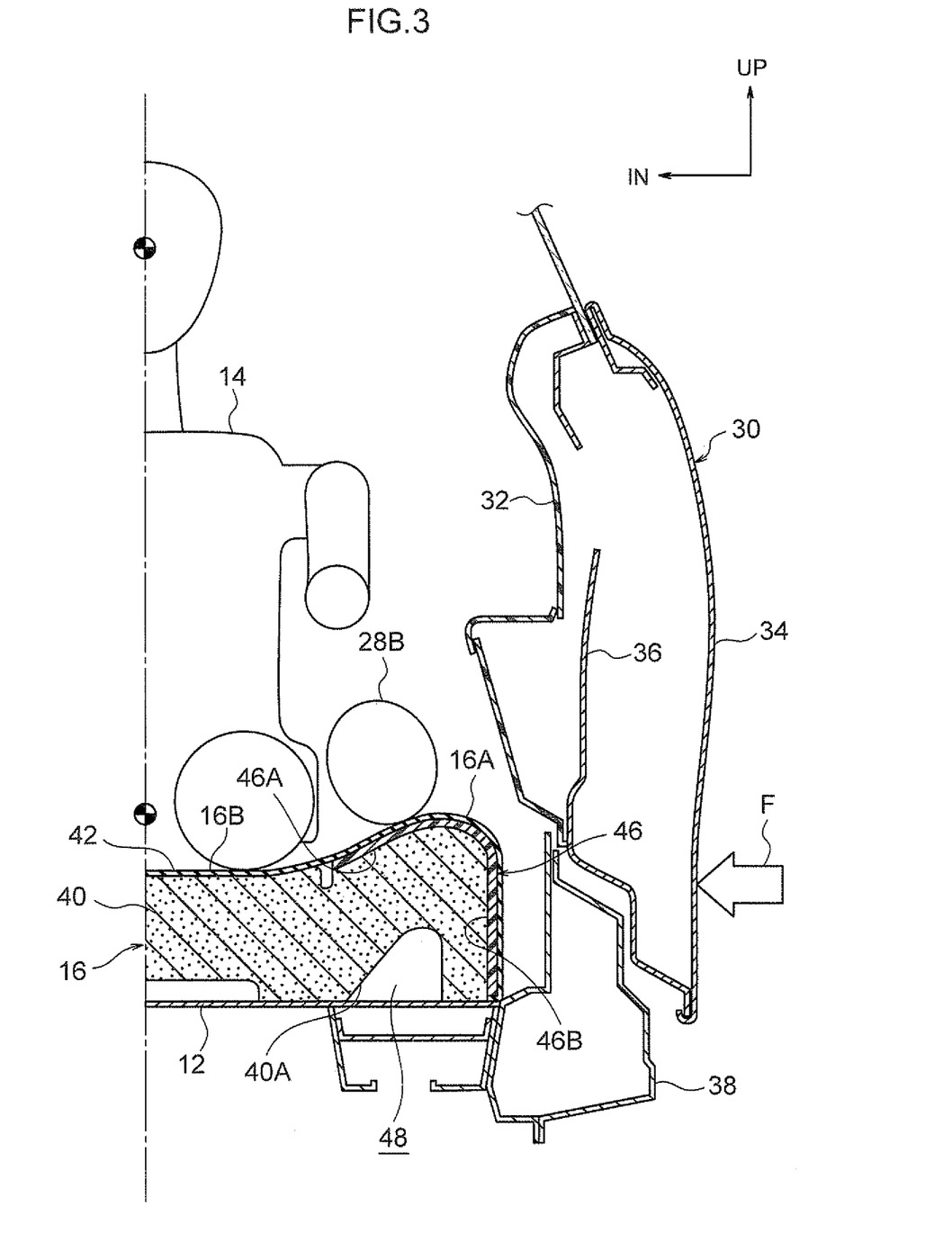
FIG. 3 is a vertical sectional diagram showing a section cut along line 3-3 of FIG. 2.

As illustrated in FIG. 2, the rear side airbag 28 is provided with a chest area chamber 28A, which inflates and deploys to sideward of the chest area of the seat occupant 14, and a waist area chamber 28B, which inflates and deploys to sideward of the waist area of the seat occupant 14. As illustrated in FIG. 3, the waist area chamber 28B inflates and deploys above a side support portion 16A provided at the seat cushion 16, between the waist area of the seat occupant 14 and a door trim 32 of a rear side door 30 (i.e., a vehicle body side portion). For clarity of description in FIG. 3, the chest area chamber 28A is not illustrated. In FIG. 3, the reference numeral 34 indicates an outer panel of the rear side door 30, the reference numeral 36 indicates an inner panel of the rear side door 30, and the reference number 38 indicates a rocker of the vehicle body.

As illustrated in FIG. 1 and FIG. 3, the seat cushion 16 is provided with a seat cushion main body portion 16B and the side support portion 16A. The seat cushion main body portion 16B supports the buttock area and thigh area of the seat occupant 14 from the lower side thereof. The side support portion 16A is disposed at the vehicle width direction outer side relative to the seat cushion main body portion 16B. As illustrated in FIG. 3, the side support portion 16A bulges at the upper side relative to the seat cushion main body portion 16B, and supports the buttock area and thigh area of the seat occupant 14 from sideward thereof.

The seat cushion 16 is provided with a seat cushion pad 40 that constitutes a cushion material of the seat cushion 16. The seat cushion pad 40 is made of, for example, a foam body of urethane foam or the like, and is supported from the lower side thereof by the rear floor panel 12. The surface of this seat cushion pad 40 is covered by a seat cover 42. The seat cover 42 is formed of cloth, leather or the like, and peripheral edge portions thereof are anchored at the lower face side of the seat cushion pad 40.

As illustrated in FIG. 1 to FIG. 3, a dilatant member 46 is provided at the side support portion 16A of each seat cushion 16. The dilatant member 46 is formed of a material with a dilatant property. The dilatant member 46 is formed in a thin plate shape, substantially in an L shape in cross section, by, for example, fabrication of d3o (trademark) by the d3o (trademark) Lab company, United Kingdom. The dilatant member 46 integrally includes an upper wall portion 46A and an outer side vertical wall portion 46B. The upper wall portion 46A is interposed between an upper face of the seat cushion pad 40 and the seat cover 42. The outer side vertical wall portion 4613 is interposed between a side face of the seat cushion pad 40 at the rear side door 30 side thereof and the seat cover 42. Thus, the upper wall portion 46A and the outer side vertical wall portion 46B are formed along the upper face and side face of the seat cushion pad 40.

As illustrated in FIG. 2, in the state in which the waist area chamber 2813 has inflated and deployed, a front end portion of the waist area chamber 28B is disposed at substantially the same position as a front end portion of the dilatant member 46 in the vehicle front-rear direction. A rear end portion of the dilatant member 46 is disposed at a rear end portion of the side support portion 16A.

When the seat cushion 16 is being fabricated, the dilatant member 46 is attached to the seat cushion pad 40, and then the dilatant member 46 is covered by the seat cover 42. Thus, a structure is formed in which the dilatant member 46 is retained between the seat cushion pad 40 and the seat cover 42. A structure is also possible in which the seat cushion pad 40 and the dilatant member 46 are integrally structured by integral foaming or the like.

In the seat cushion 16, a recess portion 40A is formed in the lower face side of the seat cushion pad 40, at the region at which the side support portion 16A is constituted. Thus, a space 48 is formed between the seat cushion pad 40 and the rear floor panel 12 at the lower side of the dilatant member 46.

Next, operation and effects of the first exemplary embodiment are described.

In the rear seat 10 with the structure described above, when the vehicle has a side collision, the rear side airbag 28 inflates and deploys above the side support portion 16A of the seat cushion 16 between the waist area of the seat occupant 14 and the rear side door 30. If the door trim 32 of the rear side door 30 collides with the side support portion 16A due to an impact force F of the side collision (see FIG. 3), the dilatant member 46 provided at the side support portion 16A instantly hardens. This dilatant member 46 exhibits an excellent energy-absorbing capability. Deformation of the side support portion 16A may be suppressed by the hardened dilatant member 46. Thus, deformation (protrusion) of the side support portion 16A to the upper side may be suppressed.

Therefore, the deployment direction of the waist area chamber 28B of the rear side airbag 28 may be prevented or suppressed from being deflected to the upper side by the seat cushion 16. In other word, it may be prevented or suppressed that the waist area chamber 2813 is pushed up by a deformed side support portion 16A. Thus, the waist area chamber 28B may be interposed between the waist area of the seat occupant 14 and the door trim 32 as intended.

Figure 4:
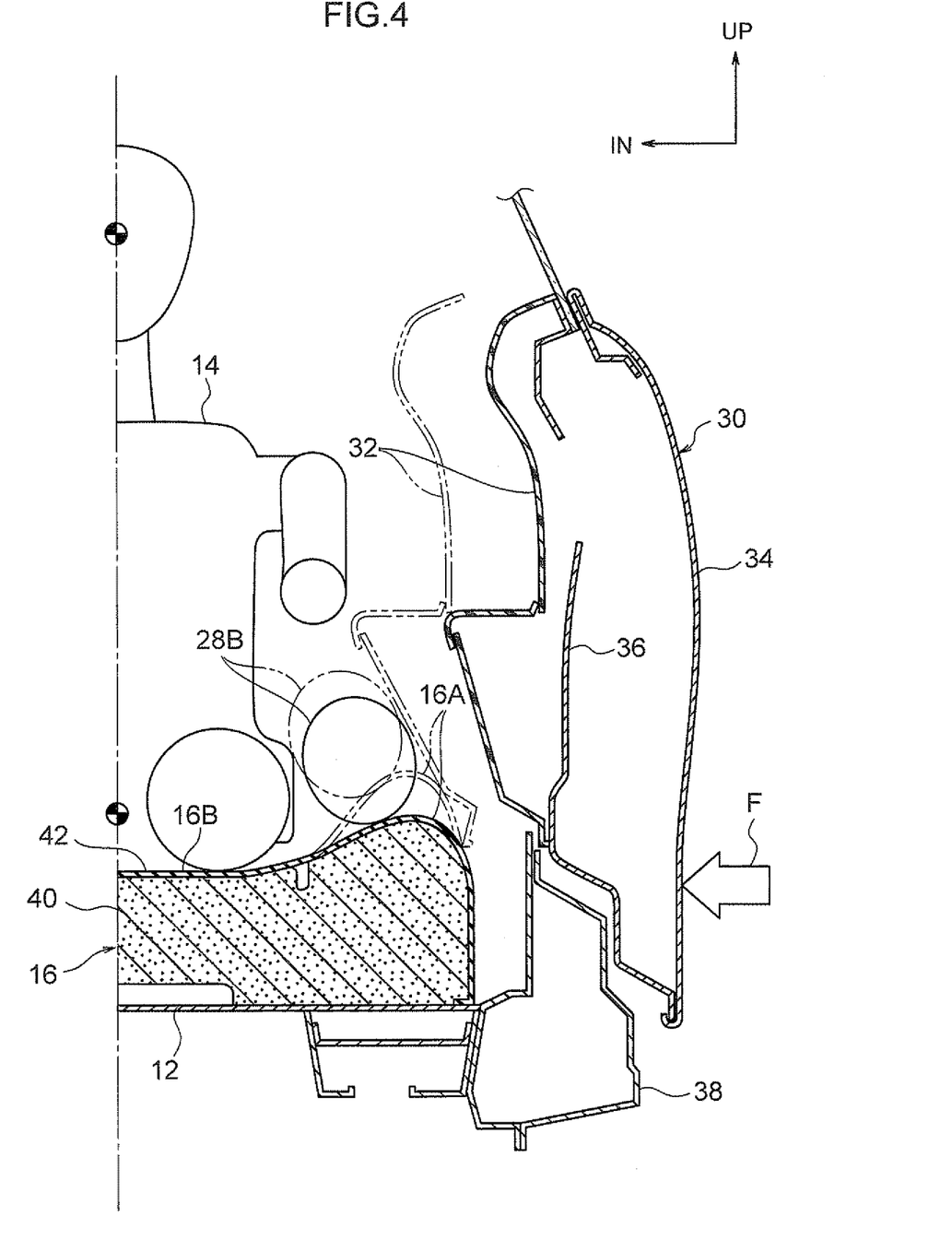
FIG. 4 is a vertical sectional diagram illustrating a comparative example of a rear seat in relation to the exemplary embodiments of the present invention.

That is, in a structure from which the dilatant member 46 is omitted (a comparative example) as illustrated in FIG. 4, when the door trim 32 collides with the side support portion 16A, the side support portion 16A is compressed to the vehicle width direction inner side, as a result of which the upper face side of the side support portion 16A is deformed so as to protrude to the upper side (see the two-dot chain lines indicating the deformed side support portion 16A in FIG. 4). In consequence, the deployment direction of the waist area chamber 288 is deflected to the upper side by the side support portion 16A. However, this may be avoided with the present exemplary embodiment. Therefore, in the present exemplary embodiment the waist area chamber 28B may be deployed between the waist area of the seat occupant 14 and the door trim 32 as intended, and occupant protection performance by the waist area chamber 28B may be excellently maintained.

Because the dilatant member 46 is soft at usual times (when no impact is applied or an impact is weak and the like), even though the dilatant member 46 is disposed at the upper face side of the side support portion 16A and deformation of the upper face side of the side support portion 16A is effectively suppressed, excellent seating comfort of the seat cushion 16 may be maintained. Because the dilatant member 46 (the deformation suppression structure of the side support portion 16A) can be arranged without affecting seating comfort, there is an advantage in a high level of design flexibility. Moreover, compared with a structure in which the side support portion 16A is reinforced by a reinforcement member formed of metal or the like, an increase in weight of the seat cushion 16 may be suppressed.

The hardened dilatant member 46 interferes with the door trim 32 that is intruding to the vehicle width direction inner side. Therefore, intrusion of the door trim 32 may be suppressed. As a result, a duration while the chest area chamber 28A and the waist area chamber 28B are deployed into may be kept long before the space for the chest area chamber 28A and the waist area chamber 28B to be deployed into might be narrowed by the intruded door trim 32, and consequently the rear side airbag 28 may be excellently deployed. Thus, occupant protection performance by the rear side airbag 28 may be excellently improved.

In the present exemplary embodiment, the upper wall portion 46A of the dilatant member 46 that is interposed between the upper face of the seat cushion pad 40 and the seat cover 42 of the side support portion 16A hardens when there is a vehicle side collision. Therefore, a deformation of the upper face side of the seat cushion pad 40 of the side support portion 16A may be directly suppressed, and deformation of the side support portion 16A to the upper side may be suppressed effectively.

The dilatant member 46 relating to the present exemplary embodiment includes the outer side vertical wall portion 4613 that is formed integrally with the upper wall portion 46A. The outer side vertical wall portion 46B is interposed between the side face of the seat cushion pad 40 and the seat cover 42. Therefore, due to an impact being applied to the outer side vertical wall portion 46B when the rear side door 30 is colliding with the side support portion 16A, molecules in the material of the dilatant member 46 instantly link together and the whole of the upper wall portion 46A and the outer side vertical wall portion 46B instantly hardens. Thus, in this exemplary embodiment, the outer side vertical wall portion 4613 functions as a detector for causing the dilatant member 46 to harden. Therefore, the dilatant member 46 may be hardened promptly and excellently. Moreover, because the upper wall portion 46A and the outer side vertical wall portion 4613 of the dilatant member 46 are interposed in thin gaps between the seat cushion pad 40 and the seat cover 42, reductions in size and weight of the dilatant member 46 may be realized.

In the present exemplary embodiment, the recess portion 40A is formed in the lower face side of the seat cushion pad 40, and the space 48 is formed between the seat cushion pad 40 and the rear floor panel 12. Therefore, when the seat cushion pad 40 is pressed to the vehicle width direction inner side by the door trim 32 colliding with the side support portion 16A, deformation of the seat cushion pad 40 to the upper side may be suppressed by the seat cushion pad 40 deforming in the direction in which the space 48 is made smaller. Thus, the dilatant member 46 may be suppressed from being lifted up to the upper side by the seat cushion pad 40, and deformation of the side support portion 16A to the upper side may be suppressed even more effectively.

The first exemplary embodiment described above has a structure in which the recess portion 40A is formed in the seat cushion pad 40. However, the inventions relating to the present claims are not limited thus. Structures from which the recess portion 40A is omitted are also applicable.

Further, the first exemplary embodiment described above has a structure in which the rear side door 30 constituting the vehicle body side portion is disposed to sideward of the rear seat 10. However, the inventions relating to the present claims are not limited thus. Structures in which a side wall of the vehicle compartment (rather than a door) is disposed to sideward of the rear seat 10 are also applicable. In such a case, an interior lining or the like attached to a body panel that constitutes the side wall of the vehicle compartment may collide with the side support portion 16A when the vehicle has a side collision.

In the first exemplary embodiment described above, a case is described in which the present invention is applied to the rear seat 10 of a vehicle. However, the present invention may also be applied to a front seat of a vehicle. Such a case has a structure in which the seat cushion pad 40 is supported at a seat cushion frame of the front seat. The points described above similarly apply to other exemplary embodiments of the present invention that are described hereinafter.

Now, other exemplary embodiments of the present invention are described. Structures and operations that are basically the same as in the first exemplary embodiment are assigned the same reference numerals as in the first exemplary embodiment and are not described.

Second Exemplary Embodiment

Figure 5A:
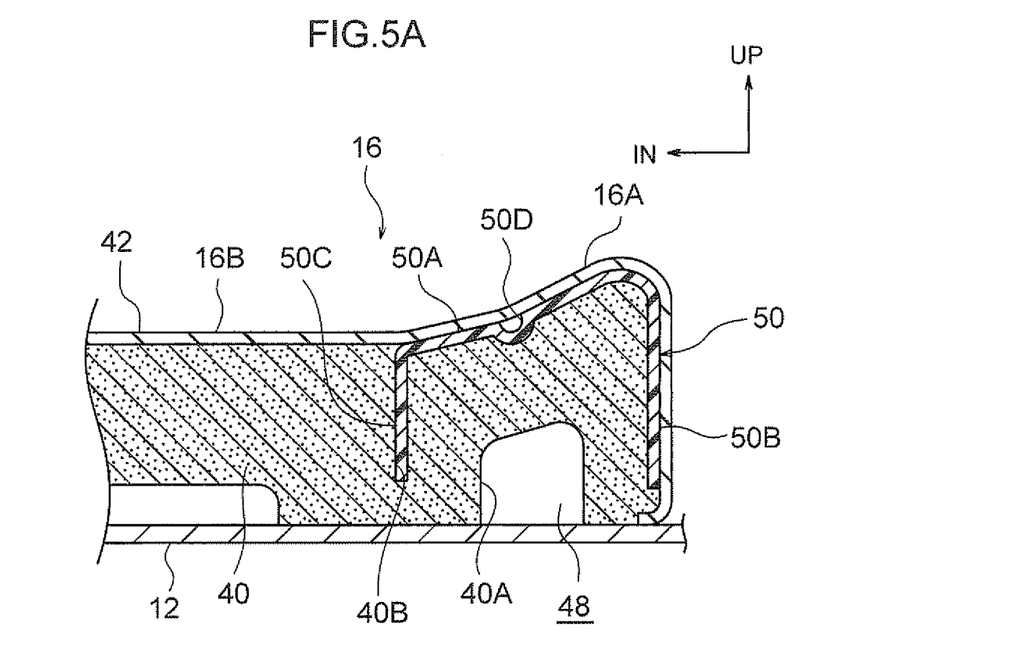
FIG. 5A is a vertical sectional diagram illustrating partial structure of a seat cushion of a rear seat relating to a second exemplary embodiment of the present invention.

FIG. 5A shows a vertical sectional diagram of partial structure of the seat cushion 16 that constitutes a vehicle rear seat relating to a second exemplary embodiment of the present invention. This exemplary embodiment has basically the same structure as the first exemplary embodiment, but a dilatant member 50 with a different structure from the dilatant member 46 relating to the first exemplary embodiment is provided at the side support portion 16A.

The dilatant member 50 is formed of the same material as the dilatant member 46, and is provided with an upper wall portion 50A and an outer side vertical wall portion 50B that have basically the same structures as the upper wall portion 46A and the outer side vertical wall portion 46B relating to the first exemplary embodiment. The dilatant member 50 is further provided with an inner side vertical wall portion 50C that extends to the lower side from an end portion of the upper wall portion 50A at the vehicle width direction inner side thereof. Viewed in the vehicle front-rear direction, the dilatant member 50 is formed in an open cross-section shape whose lower side is opened. The inner side vertical wall portion 50C is disposed in (fitted into) a slot 40B that serves as a wall accommodation portion, which is formed in the seat cushion pad 40 in advance.

A collapsing bead 50D (an indented portion) is formed in a vehicle width direction central portion of the upper wall portion 50A of the dilatant member 50. The collapsing bead 50D is formed by the vehicle width direction central portion of the upper wall portion 50A protruding to the lower side in a letter U shape in cross section, and is extended in the vehicle front-rear direction. Consequently, when a compression load in the vehicle width direction acts on the upper wall portion 50A, stress is concentrated at the collapsing bead 50D. In addition, the upper wall portion 50A is gently curved overall such that the vehicle width direction central portion is caved in the lower side.

Figure 5B:
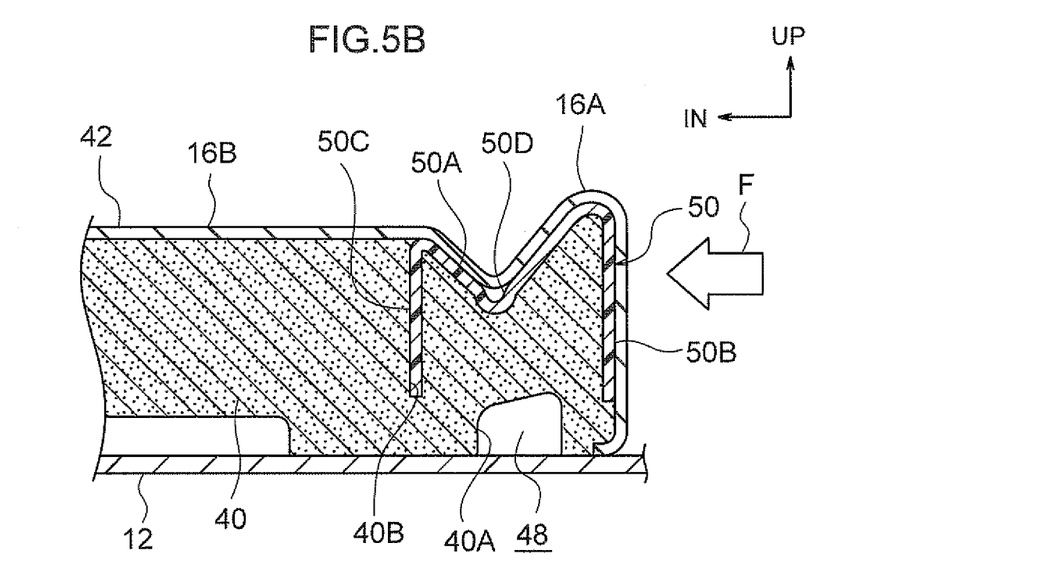
FIG. 5B is a vertical sectional diagram illustrating a state in which a collision load is inputted to a side support portion illustrated in FIG. 5A.

In this exemplary embodiment, when an impact load F acts on the outer side vertical wall portion 50B of the dilatant member 50 as illustrated in FIG. 5B due to the door trim 32 of the rear side door 30, which is not illustrated, colliding with the side support portion 16A of the seat cushion 16, molecules in the material of the dilatant member 50 link together and the whole of the dilatant member 50 instantly hardens. In this state, when the outer side vertical wall portion 50B is pressed to the vehicle width direction inner side by the door trim 32, the inner side vertical wall portion 50C disposed in the slot 40B of the seat cushion pad 40 is supported from the vehicle width direction inner side by the seat cushion pad 40, and the upper wall portion 50A is compressed in the vehicle width direction between the inner side vertical wall portion 50C and the outer side vertical wall portion 50B. Accordingly, stress concentrates at the collapsing bead 50D of the upper wall portion 50A. Because the upper wall portion 50A curves such that the vehicle width direction central portion is caved in the lower side as viewed in the vehicle front-rear direction, when the upper wall portion 50A is compressed as described above, the upper wall portion 50A is bent to the lower side at the collapsing bead 50D. In consequence, the seat cushion pad 40 and the seat cover 42 of the side support portion 16A dent to the lower side to follow the upper wall portion 50A. Thus, deformation of the side support portion 16A to the upper side may be more effectively suppressed.

The second exemplary embodiment described above has a structure in which the collapsing bead 50D is provided at the upper wall portion 50A. However, the invention relating to the present claim is not limited thus. Structures are applicable in which a vulnerable portion other than the collapsing bead 50D (for example, a thin portion) is provided at the upper wall portion 50A. Structures are also applicable in which no vulnerable portion such as the collapsing bead 50D or the like is provided.

The second exemplary embodiment described above has a structure in which the inner side vertical wall portion 50C is disposed in the slot 40B that has been formed in the seat cushion pad 40 beforehand. However, the invention relating to the present claim is not limited thus. If the dilatant member 50 is formed integrally with the seat cushion pad 40 by integral foaming or the like, the inner side vertical wall portion 50C is embedded in the seat cushion pad 40 and the wall accommodation portion that has accommodated the inner side vertical wall portion 50C is formed in the seat cushion pad 40 at the time of integral formation.

Third Exemplary Embodiment

Figure 6:
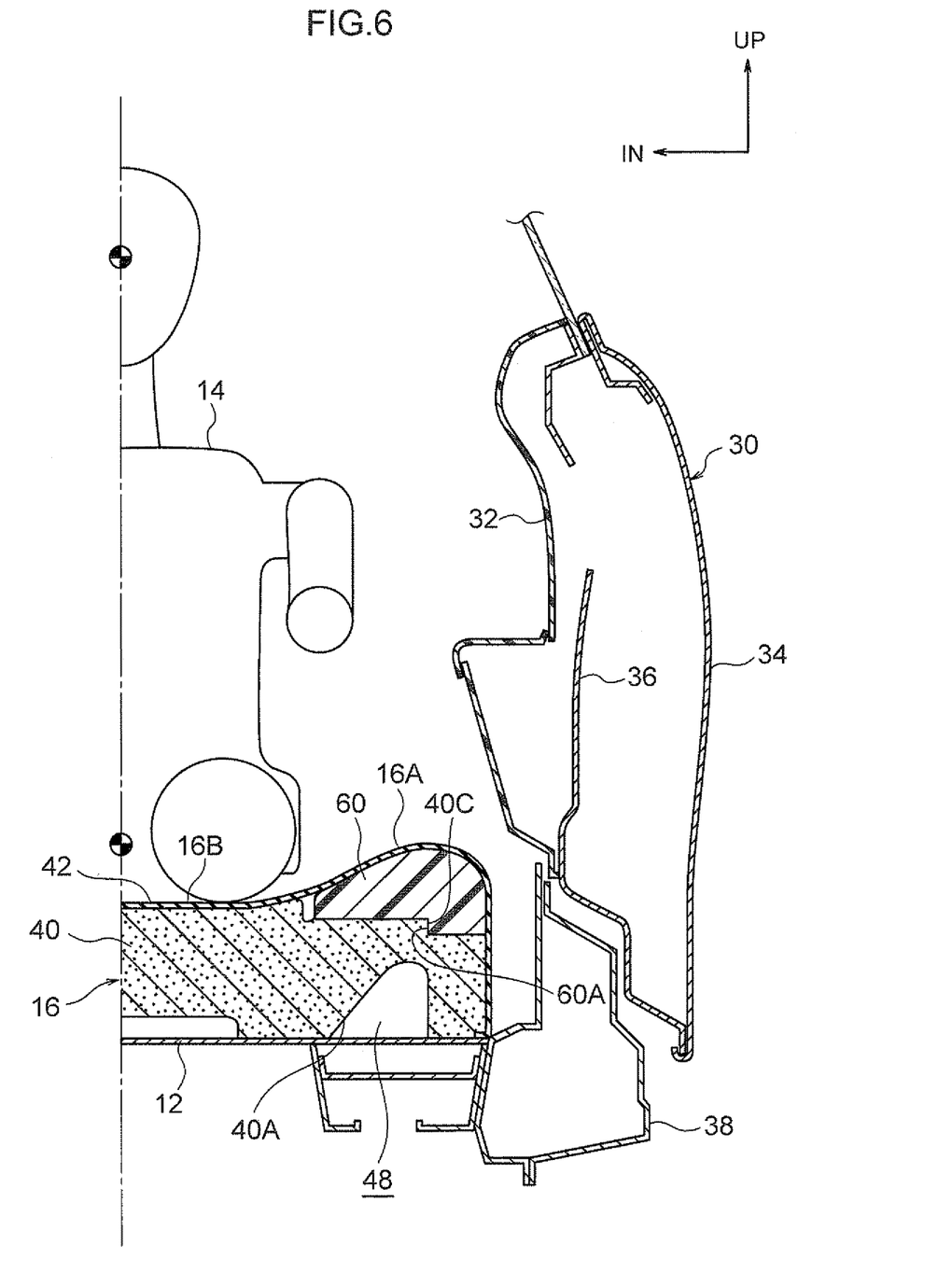
FIG. 6 is a vertical sectional diagram illustrating structure of peripheral members including a Portion of a rear seat relating to a third exemplary embodiment of the present invention.

FIG. 6 shows a vertical sectional diagram of structure of peripheral members including a portion of the seat cushion 16 that constitutes a vehicle rear seat relating to a third exemplary embodiment of the present invention. This exemplary embodiment has basically the same structure as the first exemplary embodiment, but a dilatant member 60 with a different structure from the dilatant member 46 relating to the first exemplary embodiment is provided at the side support portion 16A.

The dilatant member 60 is formed of the same material as the dilatant member 46 and, viewed in the vehicle front-rear direction, is formed as a substantially mountain-shaped bulk. The dilatant member 60 is interposed between the upper face of the seat cushion pad 40 and the seat cover 42. This dilatant member 60 is formed to be much thicker than the dilatant member 46 relating to the first exemplary embodiment. The length dimension and position in the vehicle front-rear direction of the dilatant member 60 are specified similarly to the dilatant member 46 relating to the first exemplary embodiment.

An upper face of the dilatant member 60 and a side face at the rear side door 30 side are formed as a smoothly curving surface along the exterior of the side support portion 16A. A lower face of the dilatant member 60 is formed in a flat surface shape and adhered to the upper face of the seat cushion pad 40. However, a step portion 40C is formed at the upper face of the seat cushion pad 40 and a step portion 60A is formed at the lower face side of the dilatant member 60. The step portion 60A abuts against the step portion 40C from the seat width direction outer side thereof. Therefore, displacement of the dilatant member 60 to the vehicle width direction inner side relative to the seat cushion pad 40 is restricted. The dilatant member 60 described above may be formed integrally with the seat cushion pad 40 by integral foaming or the like, or may be formed as a separate body from the seat cushion pad 40 and attached to the seat cushion pad 40 by an adhesive or the like. Alternatively, the dilatant member 60 may be formed as a separate body from the seat cushion pad 40 and retained at the seat cushion pad 40 by the seat cover 42.

In this exemplary embodiment, the dilatant member 60 that is formed as a thick bulk is interposed between the upper face of the seat cushion pad 40 and the seat cover 42. Therefore, the dilatant member 60 that is hardened in the event that the door trim 32 colliding with the side support portion 16A may suppress undesirable deformation due to a collision load from the door trim 32 side thereof. Thus, if the seat cushion pad 40 acts to deform to the upper side, such deformation of the seat cushion pad 40 may be excellently held down by the dilatant member 60. Therefore, deformation of the side support portion 16A to the upper side may be even more effectively suppressed.

Furthermore, in this exemplary embodiment, because the hardened thick bulk of the dilatant member 60 interferes with the door trim 32 intruding to the vehicle width direction inner side, the intrusion speed of the door trim 32 may be effectively reduced. As a result, a duration may be kept sufficiently before the space for the rear side airbag 28 to be deployed into is narrowed by the intruded door trim 32, and the rear side airbag 28 may be excellently deployed.

Fourth Exemplary Embodiment

Figure 7:
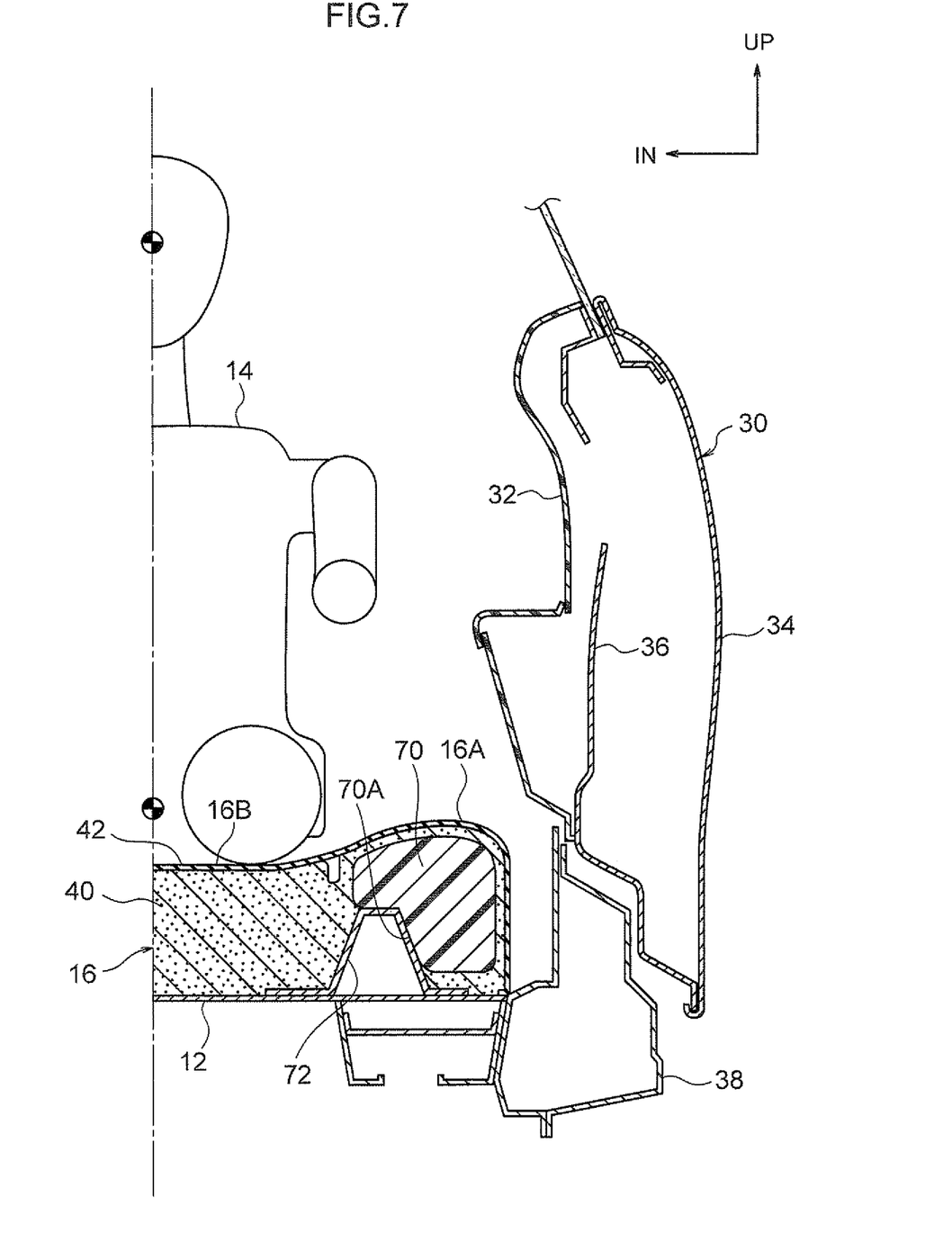
FIG. 7 is a vertical sectional diagram illustrating structure of peripheral members including a portion of a rear seat relating to a fourth exemplary embodiment of the present invention.

FIG. 7 shows a vertical sectional diagram of structure of peripheral members including a portion of the seat cushion 16 that constitutes a vehicle seat relating to a fourth exemplary embodiment of the present invention. This exemplary embodiment has basically the same structure as the first exemplary embodiment, but a dilatant member 70 with a different structure from the dilatant member 46 relating to the first exemplary embodiment is provided at the side support portion 16A.

The dilatant member 70 is formed of the same material as the dilatant member 46, is formed as a thick bulk, and is embedded in the interior of the seat cushion pad 40. An upper end of this dilatant member 70 is disposed close to the upper face of the side support portion 16A, a lower end of the dilatant member 70 is disposed close to the rear floor panel 12, and a side face of the dilatant member 70 at the rear side door 30 side thereof is disposed close to the side face of the side support portion 16A. The length dimension and position in the vehicle front-rear direction of the dilatant member 70 are specified similarly to the dilatant member 46 relating to the first exemplary embodiment.

A step portion 70A is formed at a vehicle width direction inner side region of the dilatant member 70 at the lower side thereof. This step portion 70A corresponds with a reinforcement bracket 72 (a displacement restriction portion) that is fixed to the upper face of the rear floor panel 12. The reinforcement bracket 72 is formed by a sheet metal material being inflected by machining. Viewed in the vehicle front-rear direction, the reinforcement bracket 72 is formed in a hat shape in cross section. Flange portions provided at an opening of the reinforcement bracket 72 is fixed to the rear floor panel 12 by means such as welding or the like. The reinforcement bracket 72 opposes (in this case, abuts against) the step portion 70A of the dilatant member 70 from the vehicle width direction inner side thereof. Thus, displacement of the dilatant member 70 to the vehicle width direction inner side relative to the rear floor panel 12 is restricted.

In this exemplary embodiment, when the door trim 32 of the rear side door 30 collides with the side support portion 16A due to the impact of a vehicle side collision, the dilatant member 70 provided at the side support portion 16A hardens. Thus, deformation of the side support portion 16A is suppressed and deformation of the side support portion 16A to the upper side may be suppressed.

In addition, displacement of the dilatant member 70 to the vehicle width direction inner side is restricted by the reinforcement bracket 72 that is fixed to the rear floor panel 12. Therefore, a large reaction force may be applied to the door trim 32 by the hardened dilatant member bracing between the reinforcement bracket 72 and the door trim 32. Thus, the intrusion speed of the door trim 32 to the vehicle width direction inner side may be greatly reduced, the space for deployment of the rear side airbag 28 may be excellently maintained, and occupant protection performance by the rear side airbag 28 may be improved.

The fourth exemplary embodiment described above has a structure in which the reinforcement bracket 72 (the displacement restriction portion) is fixed to the rear floor panel 12. But structures are applicable in which the displacement restriction portion is provided at the rear floor panel 12 by a portion of the rear floor panel 12 being formed to protrude toward the vehicle upper side. Moreover, the shape of the displacement restriction portion may be modified as appropriate.

If the present invention is applied to a front seat of a vehicle, a displacement restriction portion provided at a seat cushion frame of the front seat has a structure that opposes or abuts against the dilatant member from the vehicle width direction inner side.

Fifth Exemplary Embodiment

Figure 8:
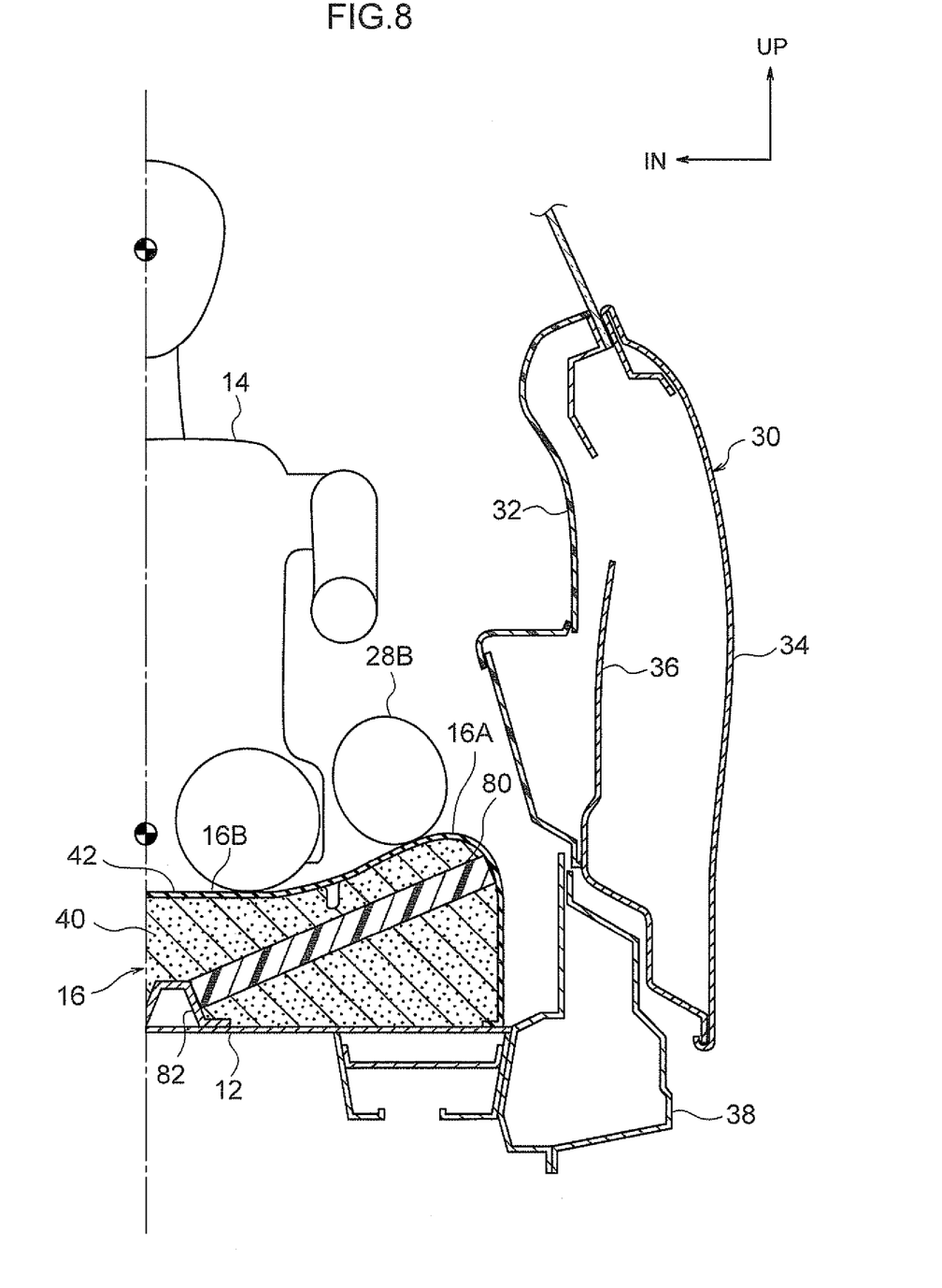
FIG. 8 is a vertical sectional diagram illustrating structure of peripheral members including a portion of a rear seat relating to a fifth exemplary embodiment of the present invention.

FIG. 8 shows a vertical sectional diagram of structure of peripheral members including a portion of the seat cushion 16 that constitutes a vehicle rear seat relating to a fifth exemplary embodiment of the present invention. This exemplary embodiment has basically the same structure as the first exemplary embodiment, but a dilatant member 80 with a different structure from the dilatant member 46 relating to the first exemplary embodiment is provided at the seat cushion 16.

The dilatant member 80 is formed in a long rod shape of the same material as the dilatant member 46, and is embedded in the seat cushion pad 40. One length direction end portion of the dilatant member 80 is disposed at the lower side of the seat cushion main body portion 16B, and abuts against a reinforcement bracket 82 that is fixed to the rear floor panel 12. Thus, displacement of the dilatant member 80 to the vehicle width direction inner side is restricted. The other length direction end portion of the dilatant member 80 is disposed at the upper side of the side support portion 16A, and is disposed close to the side face of the side support portion 16A at the rear side door 30 side thereof.

In this exemplary embodiment, when the door trim 32 of the rear side door 30 collides with the side support portion 16A due to the impact of a vehicle side collision, an impact is applied to the dilatant member 80 whose one length direction end portion is disposed at the rear side door 30 side of the side support portion 16A, and the dilatant member 80 hardens. Displacement of the dilatant member 80 to the vehicle width direction inner side is restricted by the other length direction end portion of the dilatant member 80 abutting against the reinforcement bracket 82 that is fixed to the rear floor panel 12. Therefore, deformation of the seat cushion 16 is suppressed by the dilatant member 80 bracing between the reinforcement bracket 82 and the door trim 32. Thus, deformation of the side support portion 16A is suppressed, and deformation of the side support portion 16A to the upper side may be suppressed. In addition, a large reaction force may be applied to the door trim 32 by the dilatant member 80 bracing between the reinforcement bracket 82 and the door trim 32. Therefore, the intrusion speed of the door trim 32 to the vehicle width direction inner side may be greatly reduced, the space for deployment of the rear side airbag 28 may be excellently maintained, and occupant protection performance by the rear side airbag 28 may be improved.

Hereabove, a number of exemplary embodiments have been presented and a best mode for embodying the present invention has been described. However, these exemplary embodiments are examples; numerous modifications may be embodied within a technical scope not departing from the spirit of the invention. It will be clear to those skilled in the art that the present invention is not limited by these exemplary embodiments.

The invention claimed is:

1. A vehicle seat comprising:
a side airbag that, when there is a side collision of the vehicle, inflates and deploys above a side support portion of a seat cushion, between a waist area of a seat occupant and a vehicle body side portion; and
a dilatant member that is formed of a material with a dilatant property and is provided at the side support portion, wherein:
the dilatant member is interposed between an upper face of a seat cushion pad and a seat cover that covers the seat cushion pad, and
the dilatant member comprises:
an upper wall portion that is interposed between the upper face of the seat cushion pad and the seat cover; and
an outer side vertical wall portion that extends to the lower side from an end portion at a vehicle body side of the upper wall portion, and that is interposed between a side face at the vehicle body side of the seat cushion pad and the seat cover.

2. The vehicle seat according to claim 1, further comprising a displacement restriction portion that is provided at the vehicle body or a seat frame, and that restricts displacement of the dilatant member to the vehicle width direction inner side by engaging with the dilatant member.

3. The vehicle seat according to claim 1, wherein
the dilatant member includes an inner side vertical wall portion that is extended to the lower side from an end portion of the upper wall portion at the opposite side from the end portion thereof at the vehicle body side and that is disposed in a wall accommodation portion provided in the seat cushion pad, and
the upper wall portion is curved such that, viewed in the vehicle front-rear direction, a vehicle width direction central portion thereof is caved in the lower side.

4. The vehicle seat according to claim 1, wherein
the seat cushion pad is disposed at the lower side of the dilatant member, and
a recess portion is formed at a lower face side of the seat cushion pad, the recess portion forming a space between the seat cushion pad and the vehicle body or a seat cushion frame.

5. A vehicle seat comprising:
a side airbag that, when there is a side collision of the vehicle, inflates and deploys above a side support portion of a seat cushion, between a waist area of a seat occupant and a vehicle body side portion; and
a dilatant member that is formed of a material with a dilatant property and that is provided in the seat cushion, displacement of the dilatant member to a vehicle width direction inner side being restricted by engagement with the vehicle body or a seat cushion frame, and one end of the dilatant member being disposed at a vehicle body side of the side support portion,
wherein the dilatant member is formed in a rod shape and another end portion of the dilatant member is disposed at a lower side of the seat cushion.

* * * * *